United States Patent [19]

Jeger et al.

[11] 3,723,418

[45] Mar. 27, 1973

[54] PROCESS FOR THE MANUFACTURE OF BETA-HYDRO XY-STEROID-KETONES

[75] Inventors: Oskar Jeger, Zollikerberg, Zurich; Hans Ueli Wehrli, Schaffhausen; Kurt Schaffner, Zurich, all of Switzerland

[73] Assignee: Ciba-Geigy Corporation, New York, N.Y.

[22] Filed: Nov. 13, 1970

[21] Appl. No.: 89,527

Related U.S. Application Data

[62] Division of Ser. No. 743,278, July 9, 1968, Pat. No. 3,565,778.

[30] Foreign Application Priority Data

July 13, 1967 Switzerland.....................10108/67

[52] U.S. Cl........................260/239.55 R, 260/397.4
[51] Int. Cl............................................C07c 173/00
[58] Field of Search......................260/397.4, 239.55

[56] References Cited

UNITED STATES PATENTS 2,833,794  7/1958  Goldkamp et al.................260/397.4
3,565,778  2/1971  Jeger et al.............................209/158

OTHER PUBLICATIONS

Helv. Chim Acta (1968) No. 4 Vol. 51 Pages 940–944 by Eggert et al.

*Primary Examiner*—Elbert L. Roberts
*Attorney*—Harry Goldsmith, Joseph Kolodny, Bryant W. Brennan and Edward J. Sites

[57] ABSTRACT

$\alpha,\beta$-Oxido-steroid-ketones are converted into $\beta$-hydroxy-ketones according to the partial formulas scheme

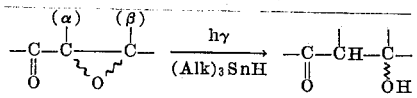

when they are treated with tri-n-butylstannane in an organic solvent while irradiating with ultraviolet light. New types of $\beta$-hydroxy-steroid-ketones are inter alia 17-oxygenated-7-methyl-5-hydroxy-3-oxo-androstanes and 19-nor-androstanes, especially the $7\alpha$-methyl-derivatives and corresponding $\Delta^1$-steroids without the 7-methyl group.

11 Claims, No Drawings

PROCESS FOR THE MANUFACTURE BETA-HYDROXY-STEROID-KETONES

CROSS-REFERENCE TO RELATED APPLICATIONS

This is a division of application Ser. No. 743,278, filed July 9, 1968, now U.S. Pat. No. 3,565,778.

BACKGROUND OF THE INVENTION

There are already known β-hydroxy-steroid-ketones of the various steroid series with the functional groups in various positions of the cyclopentano-polyhydrophenanthrene or in the side chains, for example, in the pregnane-17β side chain. Thus, inter alia in German Specification No. 960,200 Δ⁴-16-hydroxy-3,20-diones, containing a free or esterfied 21-hydroxyl groups have been described. These compounds are pharmacologically active and act as suprarenal hormones. French Pat. No. 1,463,849 discloses 5-hydroxy-3-oxosteroids of the androstane and pregnane series which are suitable for use as starting materials for the process, claimed in that French Specification, for the manufacture of 5,10-secosteroids. 1-Hydroxy-3-oxosteroids of the pregnane series, especially the 1α-hydroxy derivative of cortisone which has a much higher antiinflammatory effect than cortisone, have been mentioned for instance in Japanese Pat. No. 22,142, and 1α-hydroxy-derivatives of the 5α-androstane series having a good anabolic-androgenic activity in South African Pat No. 63/5165, and analogous compounds of the 5β-androstane series, which likewise have a good anabolic-androgenic activity, in Dutch Pat. application No. 6,501,292/65. The known methods for the manufacture of such hydroxy-steroid-ketones vary from case to case; thus, the pregnane compounds described in the afore-mentioned German Patent are obtained by adding an arylcarbinol on to the 16,17-double bond of 16,17-unsaturated pregnanes and reductive splitting of the 16-aryloxy group formed. In the case of the above-mentioned French Patent 4,5-oxido-3-ketones are temporarily ketalized and then reduced to 5-hydroxy compounds with a complex light metal hydride. The 1-hydroxy-3-oxo-androstane compounds of the said South African Patent are likewise obtained by splitting an oxido-3-ketone, namely the epoxide group of a 1,2-oxido-3-ketone, but in this case the reduction is carried out with an alkali or alkaline earth metal in liquid ammonia or in an amine.

SUMMARY OF THE INVENTION

The invention provides a new general method for the manufacture of β-hydroxy-steroids which consists in treating with a trialkylstannane an α,β-oxido-steroid-ketone in a suitable solvent, while being irradiated with ultraviolet light. The invention also comprises new β-hydroxy steroid ketones of the α- or β-androstane series preparable by the new process, and pharmaceutical preparations containing them. The new compounds display androgenic or antiandrogenic activity.

DESCRIPTION OF THE PREFERRED EMBODIMENTS

In the hydroxy-steroid-ketones obtainable with the new process of the invention the ketone group may be in the steroid ring system or in a side chain, and any desired configuration is possible at the various carbon atoms, especially also at those to which the hydroxyl group is attached. In this context the term steroid-ketone refers to any desired derivative of the cyclopentano-polyhydrophenanthrenes, that is to say not only to the normal steroids but, for example, also to 18- and 19-nor-steroids, A-homo-, B-homo-, A-nor-, B-nor-, C-nor- or D-homo-steroids.

The steroid starting material used in the new process may be any α,β-oxido-steroid-ketone, for example of the androstane, pregnane, cholane, cholestane, spirostane, cardanolide or furostane series, for instance 4,5-oxido-3-oxo-steroids, 1,2-oxido-3-oxo-steroids, 4,5oxido-6-oxo-steroids, 5,6-oxido-7-oxo-steroids, 9,11-oxido-12-oxo-steroids, -oxido-11-oxo-steroids or 3,4-oxido-2-oxo-steroids, which may contain in other free positions of the oxo-steroids, 4,5-oxido-6-oxo-steroids, 5,6-oxido-7-oxo-steroids, 9,11-oxido-12-oxo-steroids, 9,10-oxido-11-oxo-steroids or 3,4-oxido-2-oxo-steroids, which may contain in other free positions of the steroid skeleton further substituents, and the rings and/or possibly in the side chains, they may contain double bonds.

The starting materials are known or can be manufactured in known manner. For example, α, β-oxido-steroid-ketones are preferably manufactured by epoxidation of the corresponding unsaturated ketones by treatment with hydrogen peroxide in the presence of sodium hydroxide solution or by means of an organic per-acid, such as perphthalic or per-benzoic acid.

The treatment according to this invention with a trialkylstannane with irradiation is carried out in an inert solvent that is stable towards the trialkylstannane and towards the ultraviolet light used for the irradiation, if desired or required with addition of a sensitizer.

Preferred solvents are aliphatic, cycloaliphatic or aromatic hydrocarbons, especially benzene.

As sensitizers there may be used those which are generally employed in photoinduced reactions, for example triphenylene.

A suitable source of light for the irradiation according to this invention is artificial or natural ultraviolet light, preferably ultraviolet light as emitted by mercury high-pressure burners. The irradiation is preferably performed at room temperature.

Preferred trialkylstannanes are tri-lower alkylstannanes, above all tri-n-butylstannane.

Some of the process produces are known and, as mentioned above, they may be used as intermediates in the manufacture of pharmacologically active compounds or they possess as such pharmacological properties.

The present invention further includes new β-hydroxy-steroid-ketones, in fact 17-oxygenated 7-methyl-5-hydroxy-3-oxo-androstanes and 19-nor-androstanes, especially 7α-methyl derivatives of this type; also 17-oxygenated Δ¹-5-hydroxy-3-oxo-androstenes and 19-nor-androstenes, especially also their 7-methyl derivatives; and 17-oxygenated 5β-hydroxy-3-oxo-19-nor-androstanes.

This group of new compounds are thus 17-oxygenated 5-hydroxy-3-oxo-compounds of the 5α- and 5β-androstane and 19-nor-androstane series, which compounds are characterized by the presence of at least one of the following features: the 1,2-double bond, a 7-methyl group, or the β-configuration at C5 together with the 19-nor-structure.

In these compounds the substituent in position 17 is, for example, either an oxo group or a free, etherified or esterified hydroxyl group together with a hydrogen atom or with an unsubstituted or substituted, saturated or unsaturated lower aliphatic hydrocarbon residue.

An esterified hydroxyl group is above all one derived from an organic carboxylic acid of the aliphatic, alicyclic, aromatic or heterocyclic series, especially one that contains one to 18 carbon atoms, for example formic, acetic, propionic acid, a butyric acid, a valeric such as n-valeric acid, or trimethylacetic, trifluoroacetic acid, a caproic acid such as β-trimethyl-propionic acid or diethylacetic acid, oenanthic, caprylic, pelargonic, capric acid, and undecyclic acid, for example undecylenic acid, lauric, myristic, palmitic or stearic acids, for example oleic acid, cyclopropane-, cyclo-pentane-, and cyclohexane-carboxylic acid, cyclopropylmethane-carboxylic, cyclobutyl-methanecarboxylic, cyclopentylethane-carboxylic, cyclohexylethanecarboxylic acid, cyclopentyl-, cyclohexyl- or phenyl-acetic or -propionic acids, benzoic, phenoxyalkanoic acids such as phenoxyacetic acid, dicarboxylic acids such as succinic acid, phthalic, quinolic acid, furan-2-carboxylic, 5-tertiary butyl-furan-2-carboxylic, 5-bromo-furan-2-carboxylic acid, nicotinic or isonicotinic acid, or from an inorganic acid, for example a phosphoric or sulphuric acid.

An etherified hydroxyl group is especially one derived from an alkanol with one to eight carbon atoms, such as a lower aliphatic alkanol, such as ethanol, methanol, propanol, isopropanol, butyl or amyl alcohol, or from an araliphatic alcohol, especially from a monocyclic aryl-lower aliphatic alcohols such as benzyl alcohol, or from a heterocyclic alcohol such as α-tetrahydropyranol or-furanol.

The lower aliphatic hydrocarbon residue in position 17α may be saturated or unsaturated, unsubstituted, or substituted, for example, by halogen atoms. Preferably, such a residue contains one to four carbon atoms and is in the first place methyl, ethyl, propyl, vinyl, allyl, methallyl, ethinyl, propinyl, trifluoropropinyl or trichloropropinyl.

Specific compounds in these new groups are, for example, 7α-methyl-5β, 17β-dihydroxy-androstan-3-one and 7α-methyl-5β, 17β-dihydroxy-19-nor-androstan-3-one and their esters, for example their 17-monoesters or 5β,17β-diesters, for example the 17-acetates, 7α,17α-dimethyl-5β, 17β-dihydroxy-androstan-3-one and 7α-17α-dimethyl-5β,17β-dihydroxy-19-nor-androstan-3one and their esters, for example their 5β,17β-diesters; also Δ¹5β,17β-dihydroxy-androsten-3-one and Δ¹5β,17β-dihydroxy-19-nor-androsten-3-one and their esters, for example the 17-acetates; 17α-methyl-5β,17β-dihydroxy-19-nor-androstan-3-one and 17α-ethinyl-5β17β-dihydroxy-19-nor-androstan-3-one.

Another group of the new compounds of the present invention includes the 17-oxygenated Δ⁴-1α-hydroxy-3-oxo-androsten- and -19-nor-androstenes. The 17-oxygenated residue in position 17 is one of the groups defined above, the ester and ether groups and a lower aliphatic hydrocarbon residue in position 17α preferably likewise being those mentioned above. Special mention deserve, for example, Δ⁴-1α,17β-dihydroxy-androsten-3-one and its esters, for example 17β-monoesters or 1,17β-diester, especially the 17-acetate.

The new compounds of the present invention and especially the compounds specifically mentioned above are distinguished by their high androgenic and anabolic or an antiandrogenic activity.

Another object of the present invention are the starting materials to be used in the present process for the manufacture of the new Δ⁴-1α-hydroxy-androsten- and -19-nor-androstenes said above, thus the 17-oxygenated Δ⁴11α,2α-oxido-3-oxo-androstene and 19-nor-androstene compounds, for example Δ⁴-1α,2α-oxido-17β-hydroxy-androsten-3one and its esters, such as the 17-acetate, and Δ⁴-1α,2α-oxido-17β-hydroxy-19-nor-androsten-3-one and its 17-esters, such as the 17β-acetate.

The invention includes also any variant of the process in which an intermediate obtained at any stage is used as starting material and any remaining step/steps is/are carried out, or the process is discontinued at any stage thereof, or in which a starting material is formed under the reaction conditions.

The invention includes also the manufacture of pharmaceutical preparations for use in human or veterinary medicine, which contain the new pharmacologically active substances of the present invention described above as active ingredients, in conjunction or admixture with a pharmaceutical excipient. The excipient used may be an organic or inorganic substance suitable for enteral, for example oral, parenteral or local administration. Suitable excipients are substances that do not react with the new compounds, for example water, gelatin, lactose, starches, magnesium stearate talcum, vegetable oils, benzyl alcohols, gums, polyalkyleneglycols, white petroleum jelly, cholesterol or other, known medicinal excipients. The pharmaceutical preparations may be in solid form, for example tablets, dragees or capsules, or in liquid or semiliquid form solutions, suspensions, emulsions, ointments or creams. These pharmaceutical preparations may be sterilized and/or contain assistants such as preserving, stabilizing, wetting or emulsifying agents, salts for regulating the osmotic pressure or buffers. They may also contain further therapeutically valuable substances. The new compounds may also be used as starting materials in the manufacture of other valuable compounds.

The products of the present invention may also be used as additives to animal fodders.

The following Examples illustrate the invention.

Unless otherwise indicated, the irradiation is performed in benzene in a quartz test tube with a mercury highpressure burner. The infrared spectra and optical rotations have been measured in chloroform and the ultraviolet spectra in ethanol. The irradiated products have been purified by three recrystallizations from acetone-petroleum either in each case.

EXAMPLE 1

100 mg of 4β,5β-oxido-17β-acetoxy-androstan-3one are mixed with 2 ml of tri-n-butylstannane and 8 ml of benzene and the mixture is irradiated for half an hour. The resulting reaction solution is then immediately chromatographed on silica gel, the excess stannane and its reaction products being eluted with benzene. A 4:1-mixture of benzene+ethyl acetate then furnishes 12 mg of unreacted starting material. The later benzene+ethyl acetate 1:1-fractions furnish 74 mg of 5$\beta$-hydroxy-17$\beta$-acetoxy-androstan-3-one melting at 176° to 178° C (after 3 recrystallizations). Optical rotation $[\alpha]_D$ = +27° (0.37). Infrared spectrum: bands at 1028, 1255, 1712 (broad) and 3600 cm$^{-1}$.

Example 2

100 mg of 4$\beta$,5$\beta$-oxido-7$\alpha$,17$\alpha$-dimethyl-17$\alpha$-hydroxy-19-nor-androstan-3-one are treated and worked up as described in Example 1.

There are obtained 54 mg of 7$\alpha$,17$\alpha$-dimethyl-5$\beta$,17$\beta$-dihydroxy-19-nor-androstan-3-one, melting at 206° to 208°C. Optical rotation $[\alpha]_D$ = −11°(0.50). Infrared spectrum: bands at 1712 and 3595 cm$^{-1}$. In addition 31 mg of starting material are recovered.

EXAMPLE 3

100 gm of 4$\beta$,5$\beta$-oxido-17$\alpha$-methyl-17$\beta$-hydroxy-19-nor-androstan-3-one are treated as described in Example 1, to yield 71 mg of 17$\alpha$-methyl-5$\beta$,17$\beta$-dihydroxy-19-nor-androstan-3-one, melting at 181° to 183°C. Optical rotation $[\alpha]_D$ = +7° (0.40). Infrared spectrum: bands at 1711 and 3595 cm$^{-1}$. 24 mg of starting material are recovered.

EXAMPLE 4

100 mg of $\Delta^5$-3$\beta$-acetoxy-16$\alpha$,17$\alpha$-oxido-pregnen-20-one are treated as described in Example 1 (irradiation time: 2 ½ hours), to yield 23 mg of $\Delta^5$-3$\beta$-acetoxy-pregnene-16,20-dione and 27 mg of $\Delta^5$-3$\beta$-acetoxy-16$\alpha$-hydroxy-pregnen-20-one, melting at 168° C. Optical rotation $[\alpha]_D$ = −7.5° (0.4). Infrared spectrum: bands at 1256, 1703, 1730 and 3605 cm$^{-1}$. 30 mg of starting material are recovered.

EXAMPLE 5

100 mg of 1$\alpha$,2$\alpha$-oxido-17$\beta$-acetoxy-5$\alpha$-androstan-3-one are treated as described in Example 1, to yield, inter alia, 44 mg of 17$\beta$-acetoxy-5$\alpha$-androstan-3-one (identified by mixed melting point, infrared spectrum and thin-layer chromatogram) and 39 mg of 1$\alpha$-hydroxy-17$\beta$-acetoxy-5$\alpha$-androstan-3-one, melting at 239° to 243° C. Optical rotation $[\alpha]_D$ = +20° (0.46). Infrared spectrum: bands at 1250, 1720 and 3600 cm$^{-1}$.

Example 6

A mixture of 100 mg of $\Delta^4$1$\alpha$,2$\alpha$-oxido-17$\beta$-acetoxyandrosten-3-one and 1 ml of tri-n-butyl-stannane in 5 ml of dioxane is irradiated for 3 ½ with a mercury low-pressure burner, then evaporated under vacuum and chromatographed on silica gel, to yield inter alia 27 mg of $\Delta^3$-1-hydroxymethylene-17$\beta$-acetoxy-A-nor-androsten-2-one (identified by mixed melting point, infrared spectrum and thin-layer chromatogram) and 31 mg of $\Delta^4$-1$\alpha$-hydroxy-17$\beta$-acetoxyandrosten-3-one, melting at 229° to 231° C. Optical rotation $[\alpha]_D$ = +73° (0.45). Infrared spectrum: 1255, 1620, 1670, 1730, 3600 cm$^{-1}$. Ultraviolet spectrum: $\lambda_{max}$ = 243 m$\mu$ ($\epsilon$ = 15200). 18 mg of starting material are recovered.

EXAMPLE 7

200 mg of $\Delta^1$-4$\beta$,5$\beta$-oxido-17$\beta$-acetoxy-androsten-3-one are treated and worked up as described in Example 6. After chromatography on silica gel in benzene+ethyl acetate mixtures there are obtained:

a. 50 mg of 4$\beta$,5$\beta$-oxido-17$\beta$-acetoxy-androstan-3-one b. 19 mg of $\Delta^{1,10}$-17$\beta$-acetoxy-5,10-seco-androstene-3,5-dione; m.p. 215° C; optical rotation $[\alpha]_D$ = +321° (0.2)

infrared spectrum:
1254 and 1720 (broad) cm$^{-1}$ ultraviolet spectrum:
$\lambda_{max}$ 290 m$\mu$ ($\epsilon$ = 2300, in ethanol)
$\lambda_{max}$ 302 m$\mu$ ($\epsilon$ = 20300 in alcoholic 0.1N-KOH)

c. 13.5 mg of testosterone acetate d. 32 mg of O-acetyl-1-dehydrotestosterone e. 33 mg of 5$\beta$-hydroxy-17$\beta$-acetoxy-androstan-3-one f. 54 mg of $\Delta^1$-5$\beta$-hydroxy-17$\beta$-acetoxy-androstan-3-one m.p. 172° C; optical rotation $[\alpha]_D$ = +86° (0.28);

infrared spectrum:
1028, 1253, 1678, 1728, 3590 cm$^{-1}$ ultraviolet spectrum:
$\lambda_{max}$ = 232 m$\mu$ ($\epsilon$ = 9600).

EXAMPLE 8

180 mg of 4$\alpha$,5$\alpha$-oxido-17$\beta$-acetoxy-androstan-3-one are treated as described in Example 1, to yield, inter alia, 59 mg of 17$\beta$-acetoxy-5$\alpha$-androstan-3-one and 82 mg of a crystalline 1:1-mixture of 5$\beta$-hydroxy-17$\beta$-acetoxy-androstan-3-one and 5$\alpha$-hydroxy-17$\beta$-acetoxy-adrostan-3-one. We claim:

1. A member selected from the group consisting of a 7-methyl-5-hydroxy-3-oxo-androstane, a $\Delta^1$ 5$\beta$-hydroxy-3-oxo-androstene, a 5$\beta$-hydroxy-3-oxo-19-nor-androstane, and 19-nor derivatives of the above said androstane and androstene compounds, which compounds have in 17-position a member selected from the group consisting of an oxo group, a free, an esterified and an etherified $\beta$-hydroxyl group together with a member selected from the group consisting of hydrogen and an unsubstituted and a halogen-substituted saturated lower aliphatic hydrocarbon radical and a corresponding unsaturated hydrocarbon radical, each of said esterified hydroxy groups being derived from an organic carboxylic acid selected from the group consisting of acids of the aliphatic, the alicyclic, the aromatic and heterocyclic series and having from one to 18 carbon atoms and each of said etherified hydroxyl groups being derived from an alcohol selected from the group consisting of an alkanol having from one to eight carbon atoms, a monocyclic aryl-lower aliphatic alcohol, tetrahydropyranol, and tetrahydrofuranol.

2. A compound according to claim 1 and which is the 7$\alpha$-methyl-5$\beta$,17$\beta$-dihydroxy-androstan-3-one.

3. A compound according to claim 1 and which is a member selected from the group consisting of the 7$\alpha$-methyl-5$\beta$,17$\beta$-dihydroxy-19-nor-androstan-3-one and its 17-acetate.

4. A compound according to claim 1 and which is the 7$\alpha$,17$\alpha$-dimethyl-5$\beta$,17$\beta$-dihydroxy-androstan-3-one.

5. A compound according to claim 1 and which is the 7α,17α-dimethyl25β,17β-dihydroxy-19-nor-androstan-3-one.

6. A compound according to claim 1 and which is a member selected from the group consisting of the Δ¹-5β,17β-dihydroxy-androsten-3-one and its 17-acetate.

7. A compound according to claim 1, which is the Δ¹-5β,17β-dihydroxy-19-nor-androsten-3-one.

8. A compound according to claim 1, which is the 17α-methyl-5β,17β-dihydroxy-19-nor-androstan-3-one.

9. A compound according to claim 1, which is the 17α-ethinyl-5β,17β-dihydroxy-19-nor-androstan-3-one.

10. A member selected from the group consisting of a Δ⁴-1α,2α-oxido-3-oxo-androstene, and -19-nor-androstene, which compounds have in 17-position a member selected from the group consisting of an oxo group, a free, an esterified and an etherified β-hydroxyl group together with a member selected from the group consisting of hydrogen and an unsubstituted saturated lower aliphatic hydrocarbon radical and a corresponding unsaturated hydrocarbon radical, each of said esterified hydroxy groups being derived from an organic carboxylic acid selected from the group consisting of acids of the aliphatic, the alicyclic, the aromatic and heterocyclic series and having from 1 to 18 carbon atoms and each of said etherified hydroxyl groups being derived from an alcohol selected from the group consisting of an alkanol having from 1 to 8 carbon atoms, a monocyclic aryllower aliphatic alcohol, tetrahydropyranol and tetrahydrofuranol.

11. A compound according to claim 10 and which is the Δ⁴-1α,2α-oxido-17βacetoxy-androsten-3-one.

* * * * *

PO-1050
(5/69)

UNITED STATES PATENT OFFICE
CERTIFICATE OF CORRECTION

Patent No. 3,723,418          Dated March 27, 1973

Inventor(s) OSKAR JEGER ET AL

It is certified that error appears in the above-identified patent and that said Letters Patent are hereby corrected as shown below:

Column 7, line 2, after "-dimethyl" delete "2" and insert -- - --.

Signed and sealed this 14th day of May 1974.

(SEAL)
Attest:

EDWARD M.FLETCHER,JR.
Attesting Officer

C. MARSHALL DANN
Commissioner of Patents df